Dec. 6, 1938.   A. RAMBOLD   2,139,316
STAPLING APPARATUS
Original Filed May 2, 1936   4 Sheets-Sheet 1
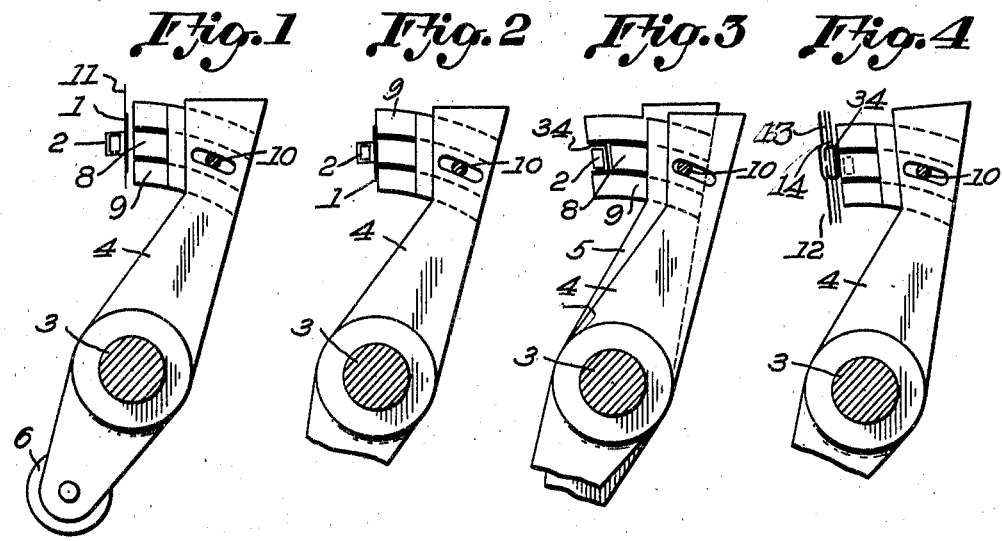
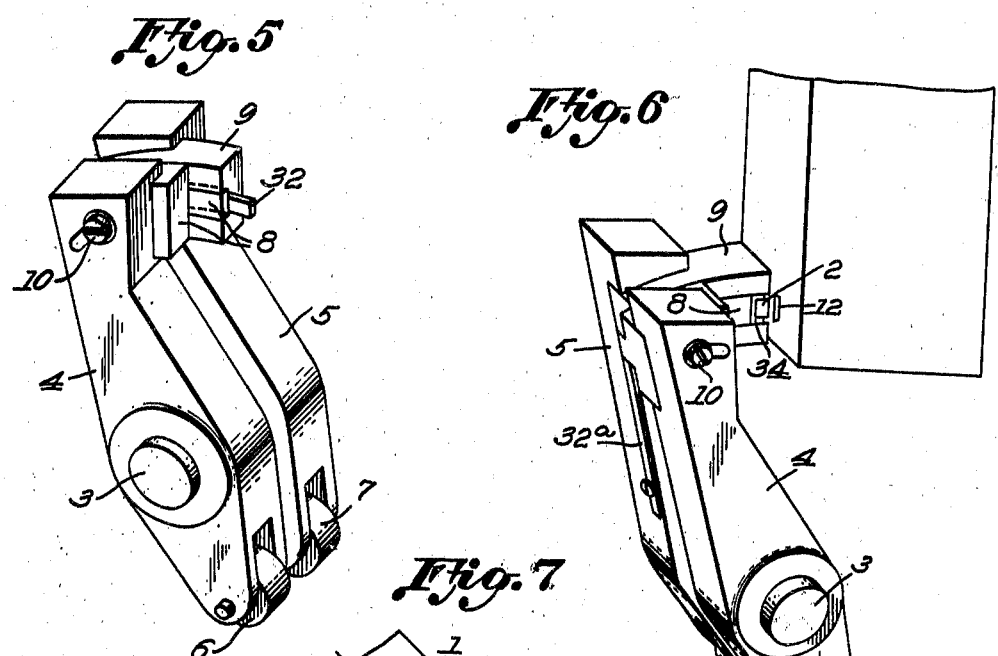
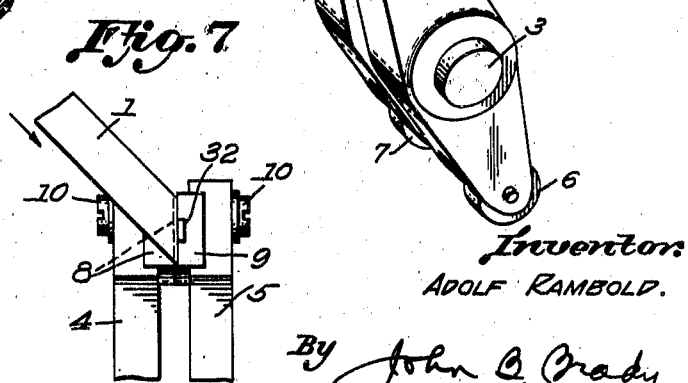
Inventor:
ADOLF RAMBOLD.
By John B. Brady
Attorney.

Dec. 6, 1938.　　　　A. RAMBOLD　　　　2,139,316
STAPLING APPARATUS
Original Filed May 2, 1936　　　4 Sheets-Sheet 2
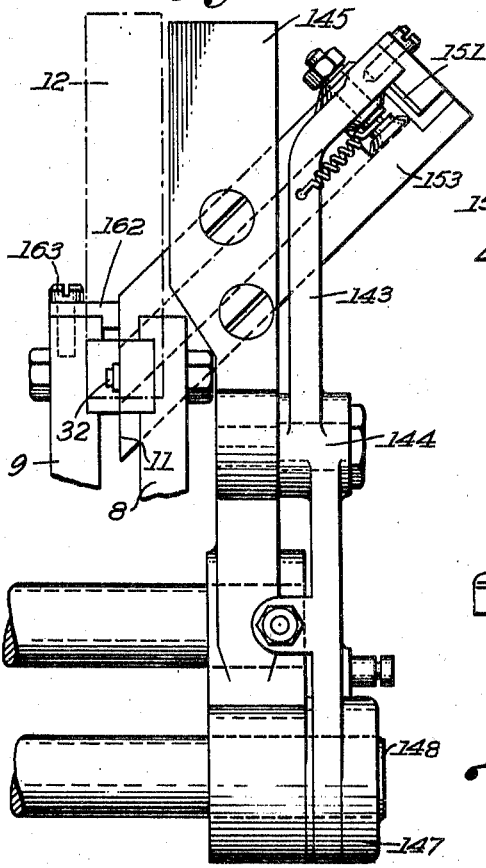
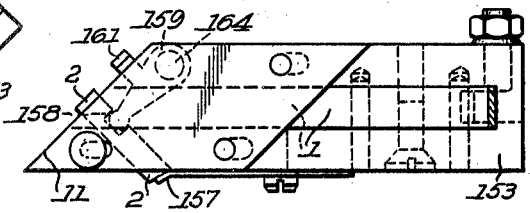
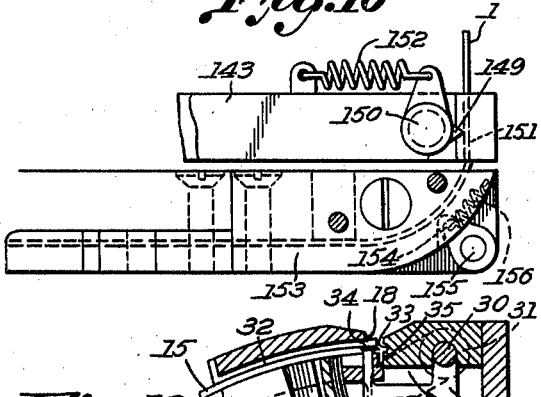
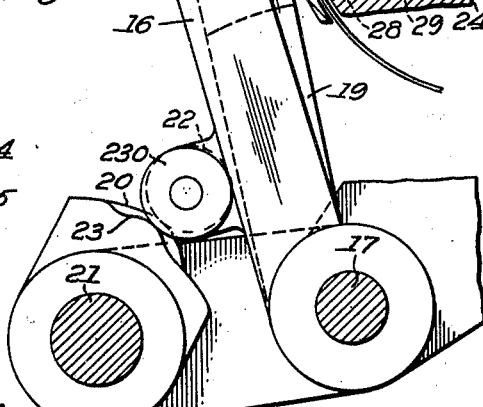
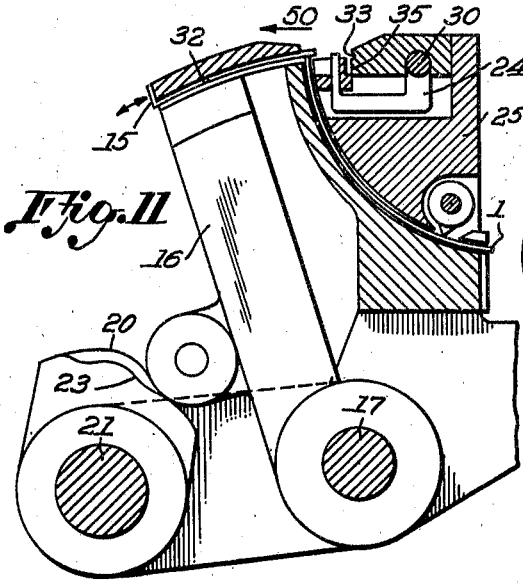
Inventor:
ADOLF RAMBOLD
By John B. Grady
Attorney.

Dec. 6, 1938.  A. RAMBOLD  2,139,316
STAPLING APPARATUS
Original Filed May 2, 1936  4 Sheets-Sheet 3
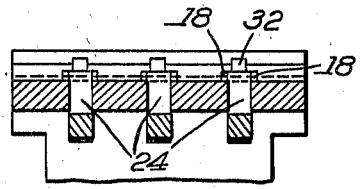
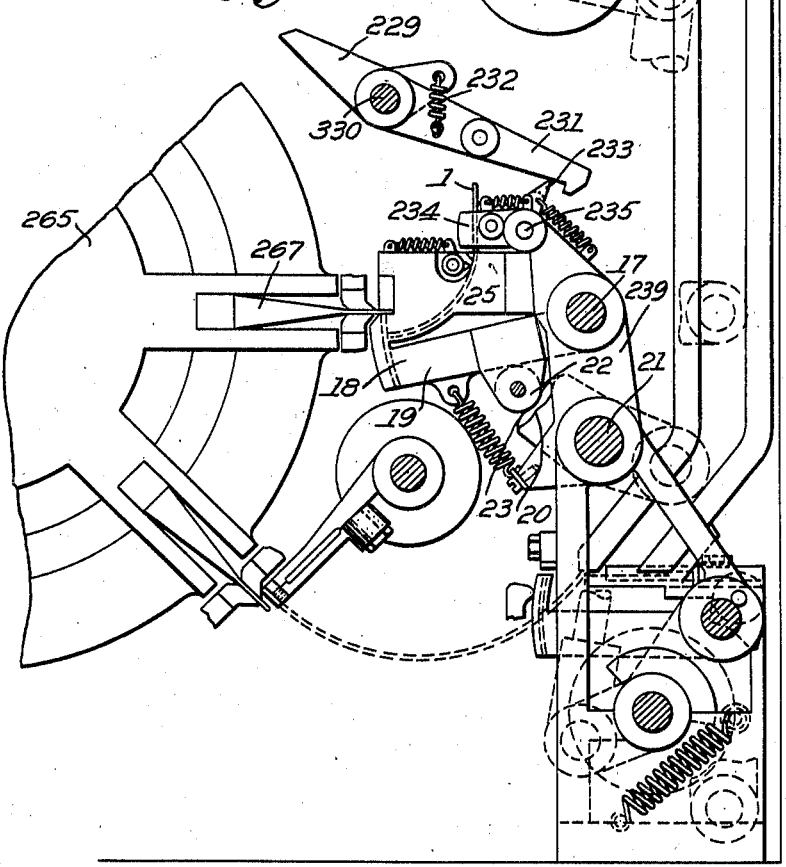
Inventor:
ADOLF RAMBOLD
By
John B. Brady
Attorney.

Dec. 6, 1938.　　　A. RAMBOLD　　　2,139,316

STAPLING APPARATUS

Original Filed May 2, 1936　　4 Sheets-Sheet 4

Inventor
ADOLF RAMBOLD.

By John B. Brady
Attorney.

Patented Dec. 6, 1938

2,139,316

UNITED STATES PATENT OFFICE 2,139,316

STAPLING APPARATUS

Adolf Rambold, Dresden, Germany

Original application May 2, 1936, Serial No. 77,580, now Patent No. 2,083,124. Divided and this application December 24, 1936, Serial No. 117,598. In Germany May 13, 1935

19 Claims. (Cl. 1—2)

This invention (which is a division from application Serial No. 77,580 filed May 2, 1936 now Patent No. 2,083,124) relates to apparatus for making and inserting staples, of the kind comprising staple-forming and staple-driving members mounted on oscillatable arms, said members and their guides being arcuate accordingly.

An object of the invention is to provide an improved and advantageous apparatus of this kind suitable for operation at high speeds. Another object is to provide for the simultaneous insertion of a plurality of staples in close proximity.

Stapling apparatus in accordance with the invention is primarily characterized in that the staple former is a single or unitary piece and at one stage of the continuous staple forming and driving operation, forms with the staple driver a common cutting edge, that is to say, the staple former and the staple driver perform the duties of a device for transversely severing the staple blank or "wire" from sheet metal strip. In this way the necessity for a separate severing device, which would render the apparatus complicated and more expensive, is eliminated.

Further, the staple former and the staple driver are preferably adjustably and detachably mounted on their oscillatable arms, whereby it becomes possible to effect extensive regrinding and always to ensure that they are correctly reset so as adequately to perform their combined function of severing device and their individual functions of forming and driving the staples.

An abutment for limiting the feed of the metal strip from which each staple blank is severed, is provided, since the staple former and the staple driver must both be retracted from the path of feed during each feed step. Conveniently, this abutment is resiliently mounted and guided on the staple former in such manner that it projects into the feed path to contact with the leading edge of the metal strip during a feed movement. However, during the operative stroke of the staple former to insert the staple the abutment is yieldingly displaced in a direction normal to the feed path. This displacement is or may be caused by the projecting end of the abutment encountering the anvil and work support.

The metal strip, which constitutes the raw material for the staples, is of a width corresponding to the length of the staple blanks to be cut therefrom. It is fed forward, from a reel or drum, by the breadth of one staple blank at each operative stroke of the apparatus, so that the individual feed movements are very small— which contributes substantially to the simplicity of the apparatus, to the avoidance of excessive wear and to the attainment of high speed of operation. By feeding the strip at an angle with reference to the direction of cutting, blanks with somewhat pointed ends are formed.

If desired, a plurality of stapling units as aforesaid may be disposed in one stapling head for simultaneous operation.

Two examples of stapling apparatus in accordance with the invention are shown on the accompanying drawings.

Fig. 1 is a diagrammatic illustration of one of these forms with the parts in the position they assume just prior to the severing of a staple blank from the metal strip, Fig. 2 after the severing of the blank, Fig. 3 after the bending or forming of the blank, and Fig. 4 after driving the formed staple.

Figs. 5 and 6 show in perspective the apparatus diagrammatically illustrated in Figs. 1 to 4, Fig. 5 prior to the severing of a staple blank and Fig. 6 after the bending of the severed blank.

Fig. 7 is a fragmentary front elevation of the same apparatus and shows the manner of feeding the metal strip thereto.

Fig. 8 shows part of the gripper for the staple strip feed with the magazine.

Fig. 9 is a plan view of the magazine.

Fig. 10 is a front elevation of the strip feed.

Fig. 11 shows a form of multiple stapling apparatus, partly in section, prior to the beginning of stapling, Fig. 12 is a similar view of this apparatus after the severing and bending operations, and Fig. 13 is a view on a smaller scale as seen from above in the direction of the arrow 50, Fig. 11.

Fig. 18 is a fragmentary side elevation of a bag-packing machine incorporating a multiple stapling apparatus as shown in Figs. 11–17.

Figure 14:
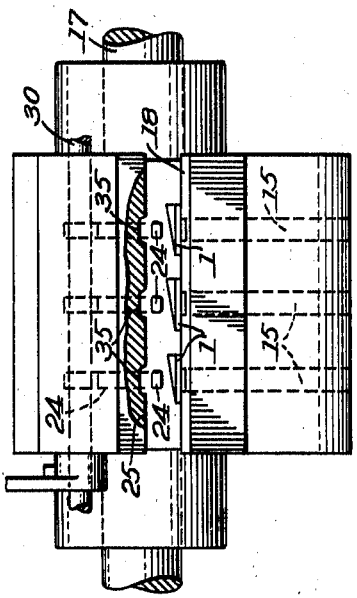
Figs. 14 to 17 show the head of said multiple stapling apparatus in the stages of operation corresponding to those illustrated in Figs. 1 to 4.

Referring first to Figs. 1 to 7, 1 denotes the metal strip from which the blanks are cut for forming into staples, 2 a bending die which is advanced and withdrawn in accordance with the rhythm of operation and over which each blank must be bent for forming a staple 34 (Fig. 3), and 3 a shaft on which two-armed rocking levers 4 and 5 are loosely mounted. The rocking levers are provided at the lower ends with cam follower rollers 6, 7, while a staple driver 8 is mounted at the upper end of the lever 4 and a staple former 9 is mounted at the upper end of the lever 5 by means of screws 10 in a detachable and adjustable manner. The lever 5 is also utilized for removing the bending die 2 from the path of the staple driver 8. Springs, not shown, hold the movable parts in their initial positions. 11 indicates the supporting wall for the incoming strip 1 and 12 indicates an anvil. 13 and 14 (Fig. 4) indicate layers of paper to be stapled. A slidable tongue 32 (Figs. 5 and 7) resiliently urged in one direction by a leaf spring 32a serves as a stop for limiting each feed movement of the metal strip 1. This tongue which is mounted in the staple former 9 also serves for guiding the severed blank during the stapling operation.

The operation of the apparatus will be easily appreciated from Figs. 1 to 4.

The driver 8 and former 9 are guided one in the other and are movable with reference to one another. Their drive is effected by the action of cam discs upon the rollers 6, 7.

For severing the staple blank from the metal strip 1 the oscillating arms 4 and 5 are simultaneously moved, the staple driver 8 and the staple former 9 then forming a joint cutting edge (see particularly Fig. 5) while the other co-acting cutting edge is formed by the supporting wall 11 (Fig. 1).

Between the bending die 2 and the blank to be severed there is a space corresponding to the thickness of the blank, and said space is filled by the severed blank as shown in Fig. 2. The driver 8 holds the blank against the bending die 2, while the former 9, indirectly operated by cams, swings further around the shaft 3 and produces the staple by bending the blank over the bending die. As soon as the U-shaped staple 34 (Fig. 3) is thus formed the bending die 2 is withdrawn from the path of the driver 8, which then swings forward and, as shown in Fig. 4, performs the stapling in co-operation with the anvil 12. The part 32 is resiliently withdrawn when it strikes the anvil.

It will be understood that the metal strip 1 is fed in a width to suit the length of the staple blank. By feeding the strip at an angle with reference to the direction of cutting as shown in Fig. 7 the severed blanks will have pointed ends.

The metal strip required for stapling is supplied by the means illustrated in Figs. 8 to 10.

The metal strip 1 is fed forward by a two armed lever 143 which is formed as a strip clamp. The lever 143 is mounted on a journal 144 disposed on a beam 145 of the machine frame. The lever 143 has a nose at its lower end which is controlled by a cam 147 mounted on a shaft 148.

On the lever 143 (see Fig. 9) there is a locking projection 149 which is rockable around a pivot 150 thereon.

In order to be able to produce a clamping action the distance apart of the projection 149 from the axis of rotation is slightly larger than that of the staple strip which is applied against the guide path 151 of the lever 143. The point of engagement is located below the axis of rotation, so that the feeding of the strip may be effected in the following manner:—

When the lever 143 is withdrawn the projection 149 moves springily downwards. When the lever 143 moves forward the projection 149 is pressed towards the axial plane of its axis of rotation and thereby the metal strip 1 is fed forward by friction to the desired extent.

The projection is pressed to the metal strip 1 by a spring 152. The metal strip 1 then moves, guided in a magazine 153, up to the cutting edge formed at the end thereof. The cutting edge is not perpendicular but inclined to the longitudinal edge of the metal strip, so that the ends of the severed staple blanks are pointed.

In order to prevent reverse movement of the metal strip a clamping device, similar to that provided on the lever 143, is mounted in the magazine 153. This clamping device comprises a locking projection 154 mounted on a pivot 155 and held by a spring 156, and operates in opposition to the locking projection 149.

Furthermore, the aforesaid bending die 2 is guided in the magazine. A leaf spring 157 holds the bending die 2 in its forward operative position.

The bending die 2 is provided with a recess 158 in which engages a control lever 159 mounted on a pivot 164 of the magazine 153. The control lever 159 has a projection 161 controlled by a cam 162 detachably secured to the staple former 9 by a screw 163 and adapted to become operative when the staple bending operation is completed.

The staple driver 8 and the staple former 9 form a joint cutting edge (Figs. 1 and 2), while the other cutting edge on the supporting wall 11 is a part of the magazine 153.

Figure 15:
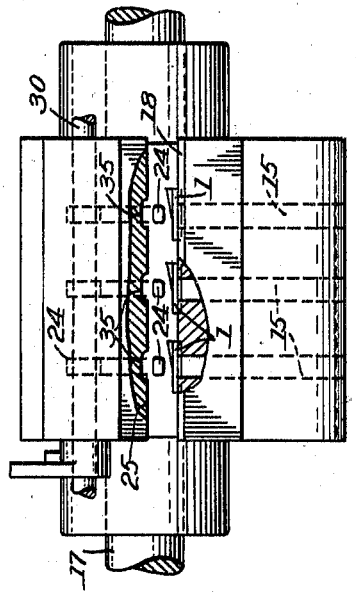
Figure 16:
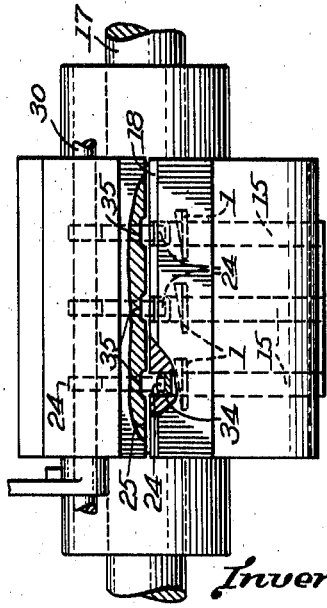
Figure 17:
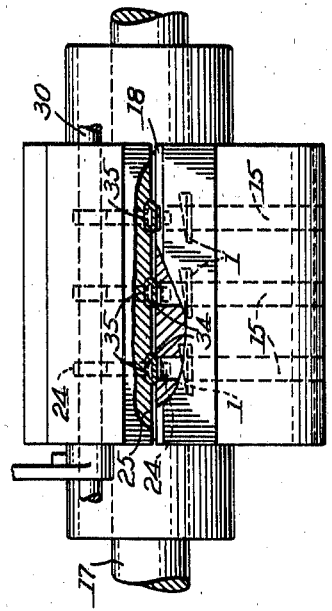

The apparatus shown in Figs. 11 to 18 has three staple drivers 15 mounted on a common arm 16 oscillatable about a shaft 17. Three staple formers 18 respectively embrace and guide the staple drivers. These formers are mounted on a fork-shaped rocking lever 19 between the limbs of which the arm 16 is disposed. The limbs of the rocking lever 19 have bosses by which this lever is loosely mounted on the shaft 17 as is the arm 16. The lever 19 is operated through a roller 22 by a governor disc 20 which is secured to a driving shaft 21, while the arm 16 is operated by a governor disc 23 and roller 230, which is also fast on the shaft 21.

24 indicates the bending die for each staple former which die is rockably mounted in the frame 25 of the metal strip feed, and 1 denotes the metal strip material from which the staple blanks are severed. Each bending die 24 is resiliently held in its position of rest and is swung therefrom by a cam 28 which is disposed on the lever 19 and acts upon a projection 29, which is formed on a lever 31 fast on the pivot pin of the bending die 24. A resiliently guided tongue 32 serves as a stop for limiting the forward movement of the strip 1, as shown in Fig. 11, and at the same time guides the severed blank during the stapling operation. The anvil for forming the staple is indicated at 33. The pre-bent staple is indicated by the reference numeral 34 and the front face of the anvil by 35.

In the machine shown in Fig. 18 the multiple stapling apparatus just described is shown disposed laterally of a feed driver 265 which is turned to bring bags 267 successively to stapling position, the apparatus serving to staple the folded mouths of the bags. It will be seen that the shaft 17 of the stapling apparatus is rockable on the bearing bracket arms 239 around the shaft 21. Above the stapler is a feeler 229 for controlling the feed of the staple-forming metal strip 1. The feeler is mounted on a shaft 330 in the machine frame and has a nose 231 which is normally elevated by a spring 232. As the bags travel round with the driver each contacts with the feeler 229 to bring the nose 231 level with a nose 233 connected to a gripping and feed member 234 for the staple-forming strip. This member 234 is mounted on a shaft 235 in a bearing bracket 239 on which the hereinbefore mentioned frame 25 is fixedly carried.

The operation of each unit of the apparatus is as follows:

The strip 1 is fed in, the extent of feed being limited by the part 32. The arm 16 and lever 19 move forward and the front edges of the staple driver and staple former become flush, whereby a blank is severed from the strip and moves up to the bending die 24 which obstructs its further passage. The cam 20 is so formed that the lever 19 moves the staple former 18 further forward, the blank being thereby bent to staple form. The staple 34 is visible in Fig. 12 because one arm of lever 19 and therewith one half of the staple former 18 is cut away. When the forming of the staple 34 is completed the cam 23, owing to the continued movement of the lever 19, exerts a pressure on the projection 29 of the lever 31 and thereby rocks the bending die 24 from the path of the staple 34. The part 32 is resiliently withdrawn when it strikes the anvil wall 35.

On the wall 35 lie the layers to be connected together by stapling (the folded mouths of a bag 267 in Fig. 18). After the bending die 24 has been removed from the path of the staple driver 15 this, controlled by the cam 23, moves further forward and performs the stapling. The stapling elements return into their initial position under the action of springs.

Each metal strip 1 is fed in a width corresponding to the length of a staple blank.

The triple stapler described enables three staples to be made and inserted in close proximity at each operating stroke of the oscillatable arms. Furthermore, since the feed strokes of the three metal strips 1 are each very small (equal to the width of a staple) high speed operation is facilitated.

Manifestly, the direction of stapling and as a preliminary to this the construction of the apparatus may be varied, so that, for example, stapling may be effected from the side as shown in Figs. 1 to 7 or from the front according to Figs. 11 to 18. This is particularly important if the apparatus has to operate in machines such as packing machines and the like.

I claim:

1. Apparatus for making and inserting staples, comprising a staple former and a staple driver mounted on oscillatable arms, said former and driver and their guides being arcuate accordingly, characterized in that the staple former consists of a single piece and forms a joint cutting edge with the staple driver.

2. In an apparatus for making and inserting staples, the combination of a one-piece staple former, a staple driver guided by said staple former, oscillatable arms, and means adjustably and detachably mounting said staple former and said staple driver on said arms.

3. In an apparatus for making and inserting staples, the combination of a one-piece staple former, a staple driver guided by said staple former, oscillatable arms, and means adjustably and detachably mounting said staple former and said staple driver on said arms, said staple former and said staple driver forming a joint cutting edge in one oscillatory position of said arms.

4. In an apparatus for making and inserting staples from metal strip, the combination of a one-piece staple former, a staple driver guided by said staple former, oscillatable arms mounting said staple former and said staple driver for simultaneous and also relative movements, said staple former and said staple driver forming a joint cutting edge in one oscillatory position of said arms, means for feeding the strip past said joint cutting edge, and a yielding abutment for limiting each feed movement of said strip.

5. In an apparatus for making and inserting staples from metal strip, the combination of a one-piece staple former, a staple driver guided by said staple former, oscillatable arms mounting said staple former and said staple driver for simultaneous and also relative movements, said staple former and said staple driver forming a joint cutting edge in one oscillatory position of said arms, means for feeding the strip past said joint cutting edge, and a yielding abutment mounted in said staple former for limiting each feed movement of said strip.

6. In apparatus for making and inserting staples from metal strip, the combination of a one-piece staple former, a staple driver guided by said staple former, oscillatable arms, means adjustably and detachably mounting said staple former and said staple driver on said arms for simultaneous and also relative movements, said staple former and said staple driver forming a joint cutting edge in one oscillatory position of said arms, means for feeding the strip past said joint cutting edge, and a yielding abutment for limiting each feed movement of said strip.

7. In apparatus for making and inserting staples from metal strip, the combination of a one-piece staple former, a staple driver guided by said staple former, oscillatable arms, means adjustably and detachably mounting said staple former and said staple driver on said arms for simultaneous and also relative movements, said staple former and said staple driver forming a joint cutting edge in one oscillatory position of said arms, means for feeding the strip past said joint cutting edge, and a yielding abutment mounted in the staple former for limiting each feed movement of said strip.

8. In apparatus for making and inserting staples from metal strip, the combination of a stapling head and a plurality of stapling units disposed adjacent one another in said head for simultaneous operation, each of said units comprising a one-piece staple former, a staple driver guided by said staple former, and oscillatable arms mounting said staple former and said staple driver for simultaneous and also relative movements.

9. In apparatus for making and inserting staples from metal strip, the combination of a stapling head and a plurality of stapling units disposed adjacent one another in said head for simultaneous operation, each of said units comprising a one-piece staple former, a staple driver guided by said staple former, and oscillatable arms mounting said staple former and said staple driver for simultaneous and also relative movements, said staple former and said staple driver forming a joint cutting edge for the metal strip in one oscillatory position of said arms.

10. In apparatus for making and inserting staples from metal strip, the combination of a stapling head and a plurality of stapling units disposed in said head, each of said units comprising a one-piece staple former, a staple driver guided by said staple former, oscillatable arms, and means adjustably and detachably mounting said staple former and said staple driver on said arms.

11. In apparatus for making and inserting staples from metal strip, the combination of a stapling head and a plurality of stapling units disposed in said head, each of said units comprising a one-piece staple former, a staple driver guided by said staple former, oscillatable arms, and means adjustably and detachably mounting said staple former and said staple driver on said arms, said staple former and said staple driver forming a joint cutting edge for the metal strip in one oscillatory position of said arms.

12. In apparatus for making and inserting staples from metal strip, the combination of a stapling head and a plurality of stapling units disposed in said head, each of said units comprising a one-piece staple former, a staple driver guided by said staple former, oscillatable arms mounting said staple former and said staple driver for simultaneous and also relative movements, said staple former and said staple driver forming a joint cutting edge in one oscillatory position of said arms, means for feeding the strip past said joint cutting edge, and a yielding abutment for limiting each feed movement of said strip.

13. In apparatus for making and inserting staples from metal strip, the combination of a stapling head and a plurality of stapling units disposed in said head, each of said units comprising a one-piece staple former, a staple driver guided by said staple former, oscillatable arms mounting said staple former and said staple driver for simultaneous and also relative movements, said staple former and said staple driver forming a joint cutting edge in one oscillatory position of said arms, means for feeding the strip past said joint cutting edge, and a yielding abutment mounted in said staple former for limiting each feed movement of said strip.

14. In apparatus for making and inserting staples from metal strip, the combination of a stapling head and a plurality of stapling units disposed in said head, each of said units comprising a one-piece staple former, a staple driver guided by said staple former, oscillatable arms, means adjustably and detachably mounting said staple former and said staple driver on said arms for simultaneous and also relative movements, said staple former and said staple driver forming a joint cutting edge in one oscillatory position of said arms, means for feeding the strip past said joint cutting edge, and a yielding abutment for limiting each feed movement of said strip.

15. In apparatus for making and inserting staples from metal strip, the combination of a stapling head and a plurality of stapling units disposed in said head, each of said units comprising a one-piece staple former, a staple driver guided by said staple former, oscillatable arms, means adjustably and detachably mounting said staple former and said staple driver on said arms for simultaneous and also relative movements, said staple former and said staple driver forming a joint cutting edge in one oscillatory position of said arms, means for feeding the strip past said joint cutting edge, and a yielding abutment mounted in the staple former for limiting each feed movement of said strip.

16. In apparatus for making and inserting staples from metal strip of a width approximating the length of each staple to be formed therefrom, the combination of a one-piece staple former, a staple driver guided by said staple former, oscillatable arms mounting said staple former and said staple driver for simultaneous and also relative movements whereby in one oscillatory position of said arms they form a joint cutting edge for the strip, and means for guiding said strip across said cutting edge.

17. In apparatus for making and inserting staples from metal strip of a width corresponding approximately to the length of each staple to be formed therefrom, the combination of a one-piece staple former, a staple driver guided by said staple former, oscillatable arms, means adjustably and detachably mounting said staple former and said staple driver on said arms for simultaneous and also relative movements whereby in one oscillatory position of said arms they form a joint cutting edge for the strip, and means for guiding said strip across said cutting edge.

18. Apparatus according to claim 16, including means for feeding said strip at an angle across said cutting edge thereby to form staple blanks with pointed ends.

19. Apparatus according to claim 17, including means for feeding said strip at an angle across said cutting edge thereby to form staple blanks with pointed ends.

ADOLF RAMBOLD.